United States Patent [11] 3,576,403

[72] Inventor Daniele, Jr. Sellari
Corinth, Miss.
[21] Appl. No. 728,958
[22] Filed May 14, 1968
[45] Patented Apr. 27, 1971
[73] Assignee International Telephone and Telegraph Corporation,
New York, N.Y.

[54] MULTIFREQUENCY SIGNAL RECEIVER

2 Claims, 6 Drawing Figs.

Figure 1:
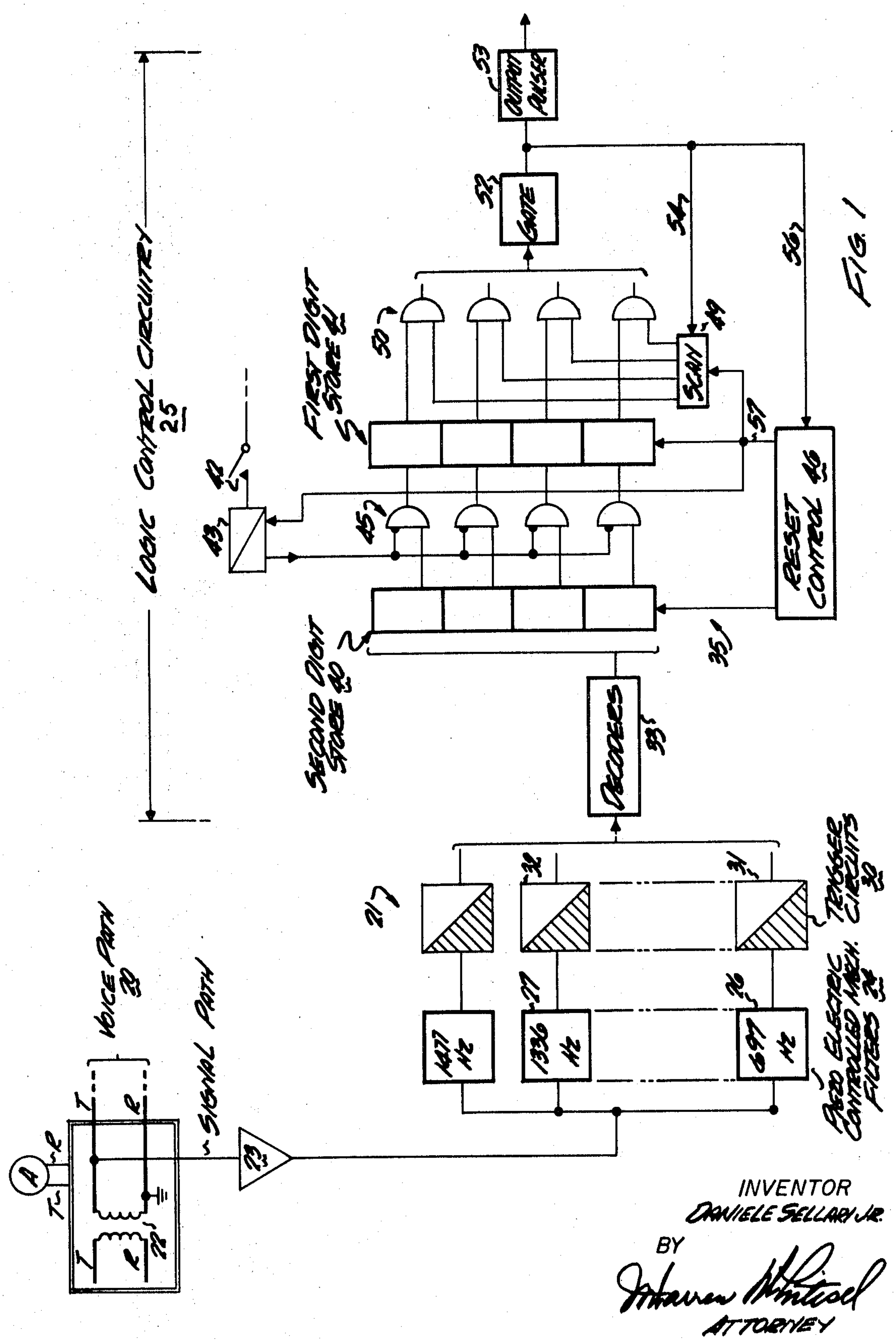

[52] U.S. Cl. .......... 179/84UF, 310/8.1, 179/16EC
[51] Int. Cl. .......... H04m 1/50, H04q 9/12
[50] Field of Search .......... 179/84 (UF), 18 (REG), 16.45; 310/8.1

[56] References Cited

UNITED STATES PATENTS

| | | | |
|---|---|---|---|
| 2,653,194 | 9/1953 | Lyons | 310/8.1X |
| 2,767,248 | 10/1956 | Warman | 179/18(REG) |
| 3,128,349 | 4/1964 | Boesch et al. | 179/84(VF) |
| 3,409,742 | 11/1968 | Winter | 179/18(REG) |
| 3,441,682 | 4/1969 | Pasternack | 179/84(UF) |

*Primary Examiner*—William C. Cooper
*Assistant Examiner*—William A. Helvestine
*Attorneys*—C. Cornell Remsen, Jr., Walter J. Baum, Rayson P. Morris, Percy P. Lantzy, J. Warren Whitesel and Delbert P. Warner ABSTRACT: A plurality of electromechanical, piezoelectric filters are tuned to particular frequencies. A multifrequency electrical signal causes mechanical resonance at the correspondingly tuned mechanical filters. Logical equipment interprets the outputs of those filters and generates the indicated number of DC pulses.

INVENTOR
DANIELE SELLARI JR.
BY
[signature]
ATTORNEY

MULTIFREQUENCY SIGNAL RECEIVER

This invention relates to multifrequency signal receivers and more particularly to receivers especially—although not exclusively—well suited for operation in modern touch dial or pushbutton telephone systems.

Recently developed telephone signaling systems are adapted to send digital signals by means of combinations of tones. In North America, the characteristic tones, duration of signals, combinations, and the like are established by specifications and standards written and adopted by a large carrier of long distance telephone traffic. Hence, an important aspect of the invention is that the signal receiver must be compatible with these standards. Of course, other nations and other industries may have other specifications and standards. That does not change the need for compatibility with those standards, whatever they are.

Very often the information signal channel is also used to transmit other signals, such as voice signals. When the voice and information signals have similar or identical characteristics, they must be separated, and the separation means must provide good immunity between the two signals. Otherwise, it is possible that information simulating frequencies in the voice signal may be misconstrued by the receiver as the touch dial signals.

At the present, information signals are separated from the voice signal by rather complex and expensive filters. Then, logic equipment must interpret the information signals. Sometimes there are unwanted responses to voice signals because reasonably priced separation filters cannot be tuned sharply enough; or, the logic equipment receives confusingly similar commands.

When it is necessary to interface between equipment designed to transmit the newer multifrequency signals and the older pulse driven equipment, there are further problems. It is necessary to provide pulse generators which generate DC pulse trains of required shape and repetition rate, and this adds a rather substantial cost.

Accordingly, an object of the invention is to provide new and improved multifrequency signal receivers. Here an object is to provide improved voice immunity at a lower cost. In this connection, an object is to give associated logic equipment such clear and unequivocal commands that the logic is greatly simplified and the cost of the interpretative equipment is sharply reduced.

Yet another object is to provide multifrequency receivers which may be manufactured from the newest and the best components, by the most modern methods, and at the lowest cost commensurate with the required quality. In particular, an object is to provide multifrequency receivers which may be made entirely from integrated circuits and compatible components.

In keeping with an aspect of this invention, a number of piezoelectric mechanical filters are tuned to each of the signal frequencies. Each filter is coupled to an electronic trigger circuit which turns on in the presence of the signal frequency. Logical circuits interpret the outputs of the trigger circuits. In one embodiment, the logical circuit is used to drive a DC pulse generator for sending out a corresponding DC pulse train.

Figure 3:
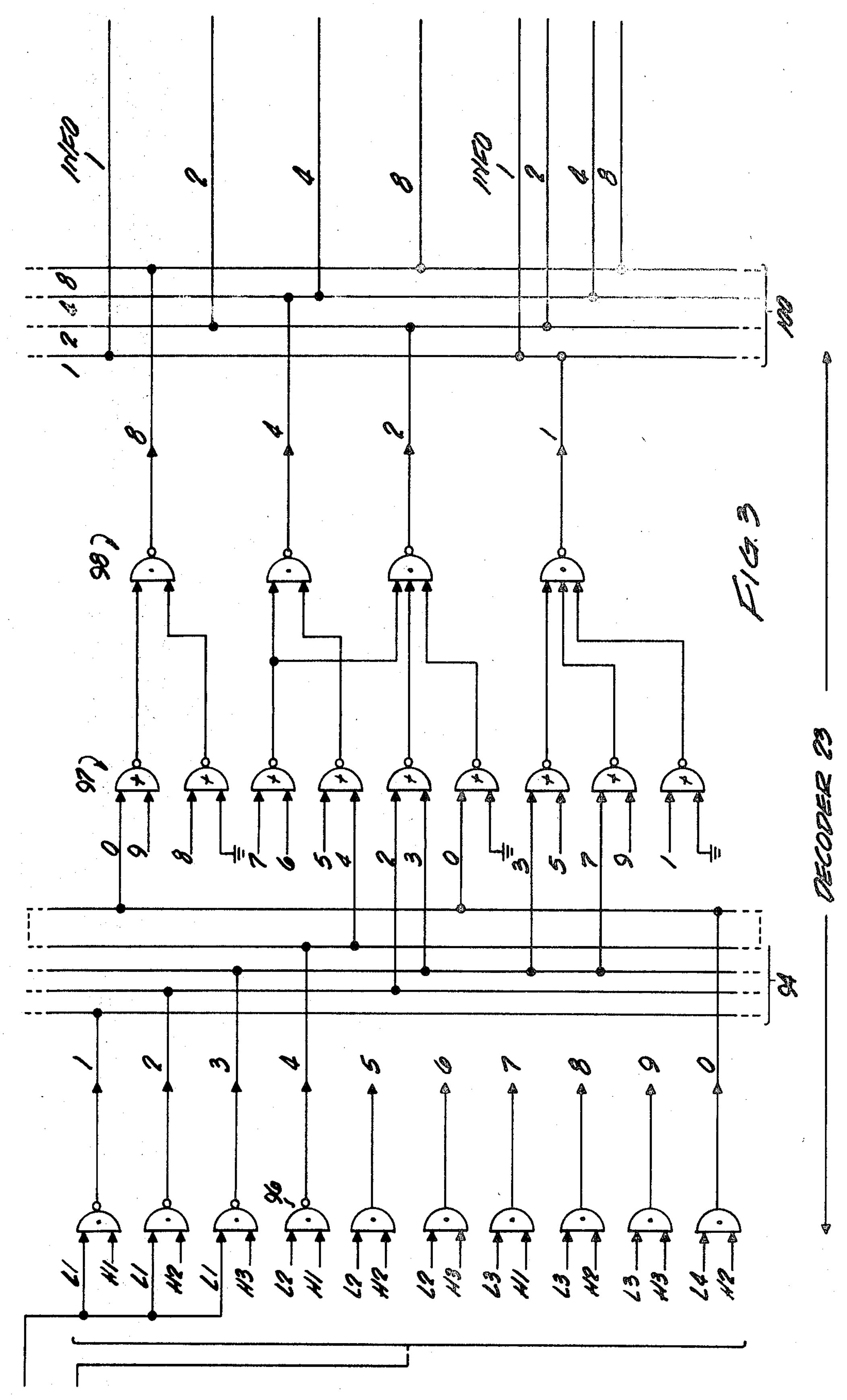
Figure 4:
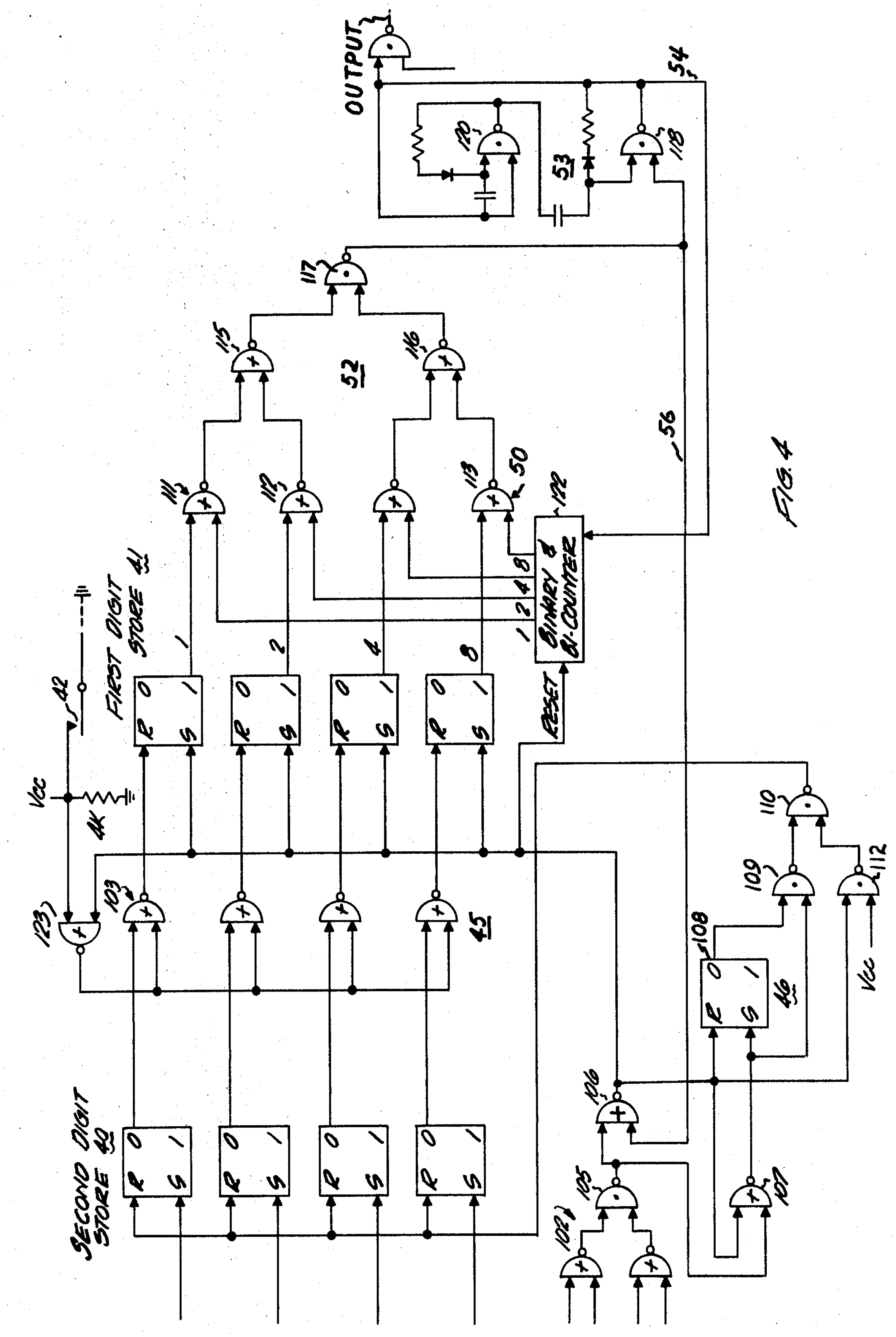
Figures 2, 5, 6:
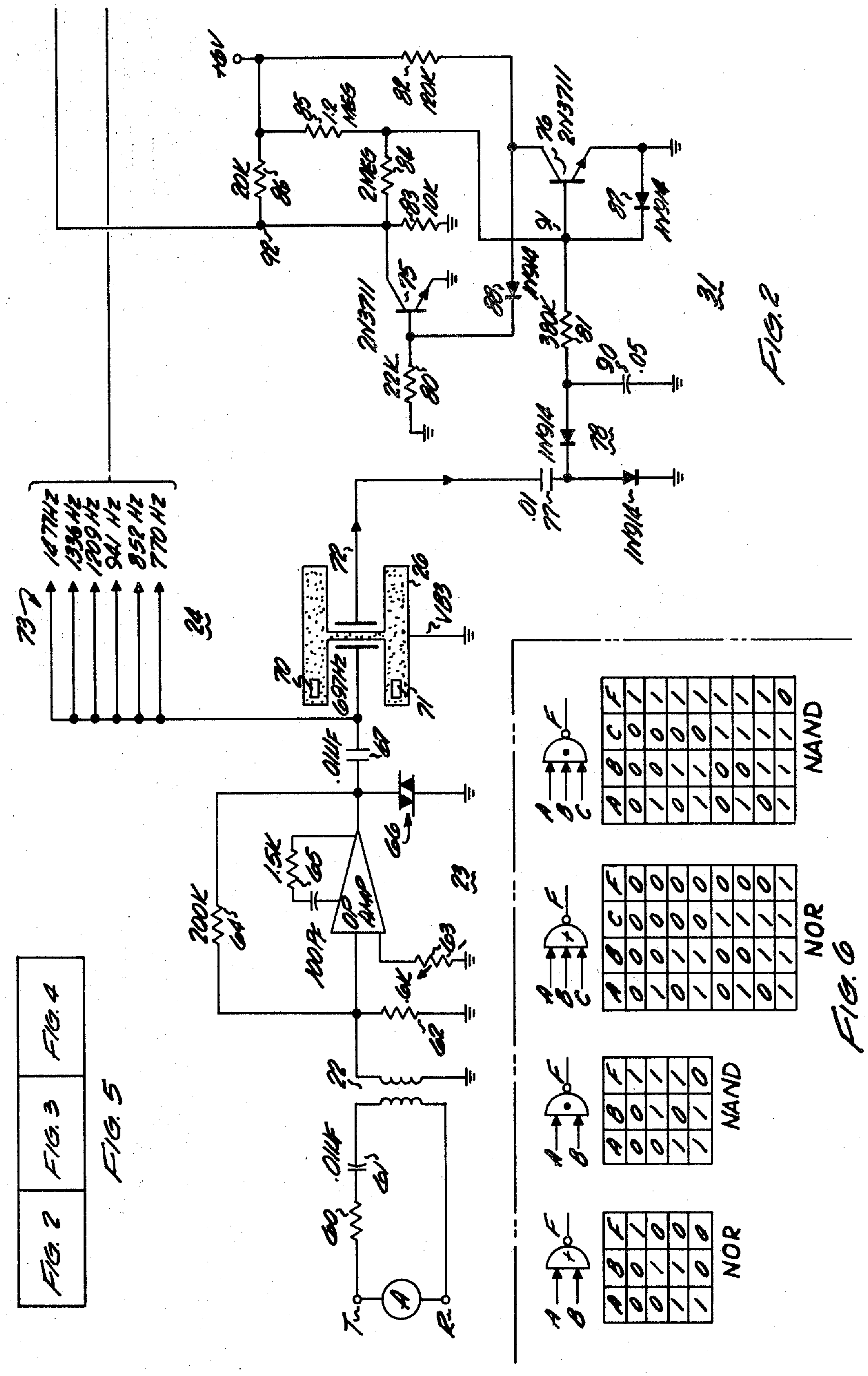

FIG. 1 is a block diagram of the inventive multifrequency receiver;

FIGS. 2—4 show the circuits required to complete the boxes of FIG. 1;

FIG. 5 shows how FIGS. 2—4 should be joined to provide a complete and understandable circuit; and FIG. 6 shows truth tables which explain the logic symbology used elsewhere in the drawings.

In the description which follows, reference will be made to a piezoelectric mechanical filter, which might be any suitable device, such as one which is sold under the trademark "Twintron" by the HB Engineering Corporation of Silver Springs, Md. This filter is described in the "Electornics" magazine for Oct. 2, 1967, pages 99 et seq., (McGraw-Hill, Inc., Publisher).

Briefly, this filter is a mechanical structure built in a configuration somewhat similar to a capital letter H. The vertical arms of the H are balanced bars which may be weighted to form a structure tuned to have a mechanical resonance at the desired frequency. The cross arm in the center of the H is a piezoelectric transducer element forming a flexible web between the balanced masses of the two arms. When the frequency of the electrical signal applied to the piezoelectric element coincides with the tuned resonant frequency of the mechanical structure, there is an electrical output signal.

FIG. 1 shows the general principles of the invention. In greater detail, a subscriber station A has access to a voice path 20 and a signal path 21. The subscriber station may take any known form, and it may be connected to the line in any known manner—either directly or via a coupling such as a transformer 22, for example.

The signal path 21 comprises an amplifier 23 having its input connected to the line 20 and its output connected to a number of piezoelectric mechanical filters 24, and they are in turn connected with logic control circuits 25.

Each one of the filters 24 is tuned to a different one of the multifrequencies used for signaling. In the present-day touch dialing signaling, these frequencies are 697 Hz., 770 Hz., 852 Hz., 941 Hz., 1209 Hz., 1336 Hz., and 1477 Hz. Thus, for example, if tones of 697 Hz. and 1335 Hz. appear simultaneously on the line 20, the filters 26, 27 go into vibration simultaneously.

One advantage of the mechanical filters is that their inherent inertia prevents them from responding instantaneously. Therefore, they automatically—and at no added cost—give the time delay commonly required to prevent a response to spurious signals of the dialing frequencies randomly occurring in normal speech. Stated another way, normal voice signals might simultaneously have randomly occurring frequencies of 697 Hz. and 1336 Hz., but such random frequencies would not normally persist for longer than, say 40 milliseconds, and they must persist at least that long for filters 26, 27 to come up to full excitation.

The output of each piezoelectric mechanical filter is coupled to an individually associated trigger circuit 30. For example, filters 26, 27 are individually coupled to the trigger circuits 31, 32, respectively. Other triggers (not shown) are similarly connected to other filters (also not shown). Each trigger circuit 30 normally stands on its shaded side until there is an output from the corresponding mechanical filter 24. Then, the trigger circuit switches to its unshaded side for the period of time that the digit key is depressed, after which it returns again to its shaded side. Any suitable circuit may be used for this purpose such as a monostable multivibrator or Schmidt trigger circuit, for example.

The outputs of these trigger circuits 30 are fed into a decoder circuit 33 of any suitable form, after which they are stored at 35. For example, the standard touch dial encoding may be two-out-of-seven frequencies representing one-out-of-ten digits. A low-cost storage device might be in a 4-bit binary word stored at 35.

The 4-bit word is stored simultaneously in two digit stores, 40, 41. Almost immediately, any suitable means (here represented by contacts 42) triggers a flip-flop or other suitable circuit 43, which applies an inhibit to plurality of gates 45. Thereafter, nothing occurring in digit store 40 can have any effect upon the digit stored at 41 as long as the inhibition continues. Then, a reset control circuit 46 resets the store 49 so that it is standing empty and ready to receive the next digit which may occur at any time depending upon the speed at which digits are sent over the line 20.

A scanner 49 scans output gates 50 in any suitable manner which generates properly encoded pulses. For example, if a decimal readout is desired, eight gates would be scanned when the digit eight is indicated. Each time that a gate 50 is enabled by the scanner 49, a gate 52 sends a pulse to an outpulse circuit 53, and a pulse over wire 54 to the scanner 49. Outpulser 53 shapes and sends a pulse in any known manner. The scanner takes another step and enables the gate 52 to send the next pulse. Eventually, the scanner 49 enables a gate which corresponds to the digital value stored at 41.

When the scanner reaches a gate in group 50 which corresponds to the value of the digit stored at 41, a signal is sent back from gate 52 over the wire 56 to the reset control circuit 46. The reset circuit sets the scanner 49 to "zero," empties the digit store circuit 41, and resets the flip-flop 43, which removes an inhibit from the gates 45.

We do not know—and it is not important—when the second digit is received. If it is received before the inhibit is removed from gates 45, it is stored in the second digit store register 40, and thereafter it is transferred to the first digit store register 41 when the inhibit is so removed. If the second digit appears sometime later than the removal of the inhibit, it is transferred directly into the digit store 41 when it is received. Then, the out pulsing process repeats.

In the description which follows, reference will be made to NOR and NAND gates, which are explained in FIG. 6. The NOR gates include + and the NAND gates include a · . In the two input NOR gate, there is a logical 1 at the output F only when logical O signals appear at each of the two input terminals A, B. By studying the truth tables and the logic symbology, the circuits may be understood.

The details of the circuits required to complete the blocks of FIG. 1 are shown in FIGS. 2—4, when joined as shown in FIG. 5. The same reference characters identify the same parts in the various drawings. Thus, the subscriber A is shown at the left of FIG. 2. Thereafter, in sequence from left-to-right are the amplifier 23, the piezoelectric filters 24, a trigger circuit 31, a decoder 23, first and second digit stores 41, 40, gates 50, 52, and output pulser 53. The reset circuit is shown at 46.

The input circuit includes a subscriber station A, the tip and ring conductors T, R, a current limiting resistor 60, a DC blocking and AC coupling capacitor 61 and transformer 22, and an impedance matching resistor 62.

The amplifier 23 includes variable impedance 63 for adjusting the zero level of the signal output. The resistor 64 provides a gain stabilizing effect. The RC network 65 controls the low frequency response level. A varistor 66 clamps the amplifier output at 10 volts and thereby limits the signal swing. The capacitor 67 provides an AC coupling.

The piezoelectric mechanical filter 26 includes means for tuning it to a particular frequency, as by driving the slugs 70, 71 into and out of threaded sleeves to adjust the mechanical resonance of the device at the desired frequency, 697 Hz. in this case. Hence, the filter 26 provides an output at 72 when a 697 Hz. input signal appears at the transformer 22. In like manner, an output appears at 73 when a voltage of one of the corresponding frequencies appears in the signal at the output of the amplifier 23. None of the other mechanical filters are shown in detail, but it should be understood that they are essentially the same as the device 26. They are adjusted to have the mechanical resonance indicated in the drawing: i.e. 770 Hz., 852 Hz., 941 Hz., 1209 Hz., 1336 Hz., and 1477 Hz., respectively.

Each piezoelectric mechanical filter output 72, 73 is coupled to an individually associated trigger circuit, such as 31. The principal components of this trigger include two NPN transistors 75, 76 coupled as common emitter circuits. The transistor 75 is normally OFF, and the transistor 76 is normally ON. The remaining components are a coupling capacitor 77, a voltage doubler 78, base bias resistors 80, 81, and a collector load 82 for the transistor 76. The resistors 83, 84, 85, and 86 form a voltage divider network coupled between the collector of the transistor 75, a +12 volt source, and the base of the transistor 76 for adjusting the bias potentials to provide a threshold level. A pair of diodes 87, 88 provide paths for the signal.

When a signal is received from the piezoelectric filter 26, the capacitor 90 charges to change the potential at the point 91 from a positive idle marking to a negative signal marking. This turns off the transistor 76 and removes the emitter ground from its collector. As a result, the +6 volts applied through the resistor 82 and diode 88 make the base of NPN transistor 75 much more positive than its emitter—and it turns on. Thus, in the signal condition, the transistor 76 is OFF, and the transistor 75 is ON.

The normal output potential at the point 92 is set by the voltage divisions of the resistor network 83—86 which is connected between ground and +7 volts. The signal output potential at the point 92 is the ground potential appearing at the emitter of the transistor 75 when the piezoelectric filter 26 is activated. In like manner, a signal out of any of the other output terminals is also triggered in the same way.

In the touch dial frequencies, it is customary to designate the individual tones as L1, ... H1, H2, ... etc. Each output from terminals 72, 73 is connected to correspondingly designated terminals at the inputs of the decoder 23. For example, the point 92 is shown as connected to the terminal L1 in the decoder. The outputs of this stage in the decoder are decimal values from 1 to zero. The drawing shows only the connections to the 1, 2, 3, 4, and 0 busses 94, but it should be understood that other similar connections may also be made to the remaining busses 5—9 (not shown). Hence, there is no need to go further than the output busses 94 in many applications of the invention where a decimal output is required.

Means are also provided for generating and sending DC signal pulses responsive to the indicated digits. Thus, if the gate 96 conducts, for example, an output circuit 53 should generate a train of four DC digit pulses.

The decimal output terminals 94 are coupled to the input terminals of a number of gates 97 which are, in turn, cross-connected to a binary decoder 98 that concentrates the 10 inputs at 94 to four outputs at 100. Those who are familiar with logic circuit symbology will understand the decoding from an inspection of the drawing.

In any event, the signals appearing on the busses 100 are binary coded digits represented the digits read out of the piezoelectric filters 24. The only reason for going to binary coding is the economic one that four flip-flops may store a digit as compared with 10 flip-flops required to store on a decimal basis, for example.

At the time when the digit is read out by the piezoelectric filters 24, a signal appearing on the busses 100 feeds through the set S inputs of the flip-flops of second digit store 40 and to the inputs of the NOR circuits 102. The flip-flops 40 are set to their O side or their l side in a coded combination which is the same as the coded combination of signals appearing on the busses 100. As each O signal disappears from an input of the gates 103, the corresponding gates conduct to set the flip-flops in the store 41. Hence, the same digit is stored in both of the digit store circuits 40, 41.

To prevent a registration of the same digit twice, at least one of the NOR gates 102 is held nonconductive with a logical O output. Since at least one input of the NAND gate 105 is at a logical O, there is a l output for holding the NOR gates 106, 107 in a O output condition. The effect is to preclude any response other than a single digit registration during the receipt of a single digit from the calling subscriber.

When the multifrequency tones disappear from the line, the filters 24 turn off and all of the potentials disappear from the busses 100. The NOR gates 102 give a 1 output and the NAND gate 105 turns off to give a O. When the NAND gate 105 turns off, the NOR gate 107 conducts to give a l. The NOR gate 106 does not give a 1 because its lowermost input is energized over conductor 56, since a digit is stored in the register 41.

Next to be described is the manner in which a DC pulse train is generated by the output circuit 53. If the multifrequency signal received at 23 represents the number 5, for example, the output circuit 53 sends a train of five DC pulses over the wire marked "Output."

In greater detail, assume first that there is nothing stored in the first digit store 41. Everyone of the flip-flops in store 41 is sitting on its 1 side, and each of the NOR gates 111 receives an input 1 signal. Thus, the two NOR gates 115, 116 receive a logical O at each of their inputs, and they present a logical 1 at their outputs. The NAND gate 117, therefore, has a logical O at its output to hold the gate 118 in a steady state condition and thereby preclude outpulsing.

When a digit is stored, at least one of the flip-flops in store 41 is switched to its O side. Thus, if the received digit is decoded to become the 4-bit binary word 0101, for example, the 1, 2, 4 and 8 busses 100 are, respectively, marked with the corresponding binary word representing potentials O, 1, O, 1 to correspondingly set the flip-flops in the digit store circuits 40, 41. The digit store circuit 41 now has potentials on the wires 1, 2, 4 and 8 wherein O appears on wires 2 and 8. Thus, in this exemplary case, the upper inputs of the NOR gates 112, 113 are marked with logical O signals. Therefore, logical 1 signals appear at their outputs and at the corresponding inputs of the NOR gates 115, 116. With a logical 1 at inputs to the gates 115, 116, a logical 0 appears at the inputs of the NAND gate 117. Its output is a logical 1. This logical 1 at the input of gate 118 is a start signal which starts the free-running multivibrator 53.

When the gate 118 turns on, the gate 120 turns off, and this in turn turns off the gate 118. A single pulse has now been sent over the "output" wire and simultaneously fed back over the wire 54 to step a binary counter 122. The output wires of the binary 122 are the same 1, 2, 4, 8 output wires that are used in most 4-bit binary words and are used for storing the digit at 41. If the first step output of the binary counter 122 coincides with the output of the first digit store 41, gate 118 holds the output gate in a clamped condition. On the other hand, if the output of the binary counter 122 is not the same binary word as that represented by the output of the first digit store 41, the multivibrator 53 generates another pulse which both triggers an output and feeds a signal back over the wire 54 to step the binary counter 122 a second step. Again, a comparison is made, and either a new pulse is generated or the scanning binary counter 122 is stepped again.

In greater detail, it has been assumed that a logical 0 appears on the wires 2 and 8 out of the digit store circuit 41. In normal counting, the digit 4 causes the output of the binary counter 122 to present a binary 1 to each of the gates 112, 113, and they turn off to give a logical 0 at their output. The other two gates in the group 111 are held "off" (at logical 0) by the 1 signals on the wires 1 and 4 out of the digit store circuit 41.

When every one of the gates 111 has a 0 at its output, a logical 1 appears at both of the inputs of the gate 117, and its output goes to 0. This stops the free-running cycle of the multivibrator 53, to terminate the outpulsing. Also no output pulse is fed back over the wire 54, so the binary counter 122 does not step again.

When the 0 appears at the output of the gate 117, it also appears at the lower input of NOR gate 106. If any of the busses 100 are marked to indicate that a digit is being received, there is a 1 at the upper input of the gate 106 to prevent any further response at this time. However, if or when the busses 100 are no longer marked, there is a 0 at both inputs to the gate 106, and a 1 appears at the output.

The logical 1 at the output of the gate 106 feeds out to reset the binary counter 122 and to set a 1 in each flip-flop in the digit store 41. The 1 from the gate 106 also appears at the lowermost input of the gate 123 to hold it off.

The next function depends upon when a second digit is received from a calling subscriber. That digit will, of course, come in whenever the digit is keyed and that, in turn, depends upon when the subscriber elects to key the digit. Actually, the timing of this digit is not important since the equipment is standing and waiting for the digit when it comes in.

In greater detail, when the first digit is received, a marking appears on one or more of the busses 100. The markings at any one of the inputs of the NOR gates 102 remove signals from the inputs of the NAND gate 105. The output of gate 105 goes to a logical 1 stage. This turns off the NOR gate 106 and removes the reset from the binary counter 122 and from the digit store circuit 41, thereby enabling the operation of the register and readout circuit. The logical 0 at the output of the gate 106 appears at the input of the NOR circuit 123 to cause a 1 at its output, and this inhibits the gates 103 to preclude further digit registration. Finally, the logical 0 at the output of the gate 106 feeds into the reset or R side of the flip-flop 108 to hold a 0 output.

The 0 out of flip-flop 108 maintains a 1 at the output of gate 109. This 1, in turn, maintains a 0 at the output of the gate 110 to preclude any resetting of the digit store circuit 40. Therefore, it is not possible to change the digit in the store circuit 40 until after the potentials disappear from the busses 100.

When the subscriber removes his finger from a digit key, the potentials disappear from the busses 100. The removal of all logical 1 signals from the busses 100 causes a logical 1 to appear at both of the output terminals of the gate 102. Hence a 0 signal appears at the output of the gate 105. There is no immediate effect upon the output of the gate 106 because the signal stored in the first digit store circuit 41 feeds back a signal from the output of the gate 117 over wire 56 to the lowermost input of the gate 106 to preclude a 1 output at this time. The 0 output signals from the gates 105, 106 cause a logical 1 signal to appear at the output of the gate 107. The flip-flop 108 sets to its 1 side, and the NAND gate 109 turns on to give a 1 output. During the transition time while the gate 109 is switching, there is a rising voltage waveform which sends a pulse through the gate 110, to reset all of the flip-flops in the register 40 to their 0 side. As soon as that pulse disappears, the register 40 is standing ready to receive the second digit.

When the subscriber keys the second digit, a number of potentials appear on the busses 100 in a coded combination which corresponds to the binary word identifying the numerical value of the keyed digit. This sets the flip-flop in the second digit store to the same coded combination.

At some time, which is not important, the first digit store has completed the outpulsing cycle, and the gate 117 switches its output terminal to a logical 0. If the busses 100 are not marked at this time (no digit is being keyed by the calling subscriber), a logical 0 appears at both of the inputs to the gate 106, and 1 appears at its output. This 1 sets each of the flip-flops in the first digit store 41 to give a 1 output (which is a zero set).

The contacts 42 represent any suitable device for identifying the end of outpulsing, such as contacts on the well-known shunt relay. As those skilled in the art know, this relay has slow release characteristics such that it operates on the first pulse in a digit pulse train and releases at the end of a delay time following the end of the last pulse in the train. During the pulse train, the relay holds itself operated owing to its own slow release characteristics. Thus, the contacts 42 represent any suitable device for inhibiting the gate 123 during transmission of a dial pulse train. At the end of outpulsing, the inhibit is removed.

When outpulsing is so completed, as indicated by the zero set of the first digit store circuit 41 and by the end of pulse train signal at the contacts 42, the gate 123 removes its clamp from the gates 103, and the digit stored at 40 is transferred into storage at 41. Thereafter, the outpulsing occurs, as before, and the second digit is sent.

From the foregoing, it should now be apparent that the invention provides a multifrequency signal receiver having a general utility. It may be used as a multifrequency detector, per se, or as a converter from multifrequency to decimal, binary, or DC pulse trains. Accordingly, the possible utilization of the invention goes far beyond a simple telephone key dial receiver.

While the principles of the invention have been described above in connection with specific apparatus and applications, it is to be understood that this description is made only by way of example and not as a limitation on the scope of the invention.

I claim:

1. A telephone multifrequency dialing response and signal generating network, comprising a subscriber station capable of generating at least one multifrequency dialing signal, an amplifier receptive of received dialing signals, a plurality of electromechanical filters connected in multiple to the output of said amplifier, means in each of said filters for tuning the response to the filter to a predetermined signal frequency within the range of frequencies used in telephone dialing, mechanical means at each of said filters for resonating in response to a signal of at least a predetermined duration at the frequency to which tuned to generate an output signal, trigger means for each filter responsive to an output signal therefrom for emitting a pulse, a plurality of gate circuits connected to respond to emitted pulses from said trigger circuits to code the response therefrom into a code signal corresponding to a dialed digit.

2. A network as claimed in claim 1, further comprising means for translating a dialed digit into a series of pulses of finite duration including a first set of gate circuits means responsive to receipt of a code signal for actuating certain of said gate circuits, further gate circuits responsive to actuated gate circuits for further coding a received digit into binary form, means for storing a binary received digit, and outpulsing means comprising a multivibrator productive of a pulse output, and means for signalling said multivibrator to cease outpulsing at the conclusion of a series of outpulses corresponding to a dialed digit.